Oct. 29, 1968  W. BURGER  3,408,122
AXIAL PLAIN BEARING
Filed July 19, 1966  2 Sheets-Sheet 2

Jeanne Fanny Burger and
Uli Raymond Burger-Straumann
Sole Heirs of The Estate
Of The INVENTOR.
Willy Burger, Deceased
BY
Pierce, Scheffler & Parker
ATTORNEYS United States Patent Office 3,408,122
Patented Oct. 29, 1968

3,408,122
AXIAL PLAIN BEARING
Willy Burger, deceased, late of Wettingen, Switzerland, by Jeanne Fanny Burger and Uli Raymond Burger-Straumann, sole heirs, Wettingen, Switzerland, assignor to Aktiengesellschaft Brown, Boveri & Cie, Baden, Switzerland, a joint-stock company of Switzerland
Filed July 19, 1966, Ser. No. 566,394
Claims priority, application Switzerland, July 28, 1965, 10,541/65
4 Claims. (Cl. 308—160)

ABSTRACT OF THE DISCLOSURE

A plain bearing structure for absorbing axial thrust of a rotatable shaft comprises a plurality of bearer segments arranged around the shaft and which establish a sliding contact with a collar on the shaft. Each bearer segment includes an array of internal cooling ducts arranged parallel with and close to that face of the segment which confronts the face of the shaft collar and a liquid lubricating medium under pressure passes first through the cooling ducts to extract heat from the segment and is thence delivered to a substantially radially extending distribution channel open along its entire length from which it discharges in the direction of the face of the thrust collar to lubricate the contacting faces of the bearer segments and shaft collar. The lubricating medium is then immediately drained from an annular chamber surrounding a part of the shaft collar and bearer segments so that this chamber does not fill with the medium and entail additional losses.

---

As is known, axial plain bearings serve to take up large thrust forces from the shafts of rotating machines such as steam and gas turbines. Stationary thrust bearer segments take up the axial forces from a rotating shaft-collar, and transmit them to the body of the bearing.

There is a known axial plain bearing wherein the bearer segments consist of a stiff bearer piece capable of tilting movement and a thinner flexible plate, cooling and lubricating ducts being present between the bearer piece and the plate. The cooling and lubricating oil is fed to each bearer segment via a flexible pipe. The oil emerging from the open cooling ducts passes on the one hand into the annular chamber between the face of the shaft-washer and the bearing housing. On the other hand, the oil circulates round the shaft into the space between the shaft-collar and the shaft-seals. From this space, the oil is drawn into the conical clearances between the bearer segments and the shaft-collar, and is likewise delivered to the said annular chamber, whence the used oil is taken off via a discharge pipe.

In this known axial plain bearing, the shaft-collar and bearer segments are completely enclosed in an oil-filled bearing housing in which the lubricating oil is at a pressure of 1–2 kg./cm.². The increase in unit outputs of steam and gas turbines has caused the dimensions of axial plain bearings to become continually greater. With the usual high shaft speeds this leads in particular to a large amount of heat being developed, because in the case of known axial plain bearings the shaft-collar rotates in a space completely filled with oil.

The present invention is intended to avoid the disadvantage of a large amount of heat being developed, and at the same time impart high specific loading to the bearer segments.

According to the invention, the axial plain bearing with a plurality of bearer segments on which a shaft-collar slides and which comprise cooling ducts for conveying a combined coolant and lubricant is characterised in that the cooling ducts in the bearer segments open out on the contact side of the shaft-collar on the sliding surface thereof.

Figure 1:
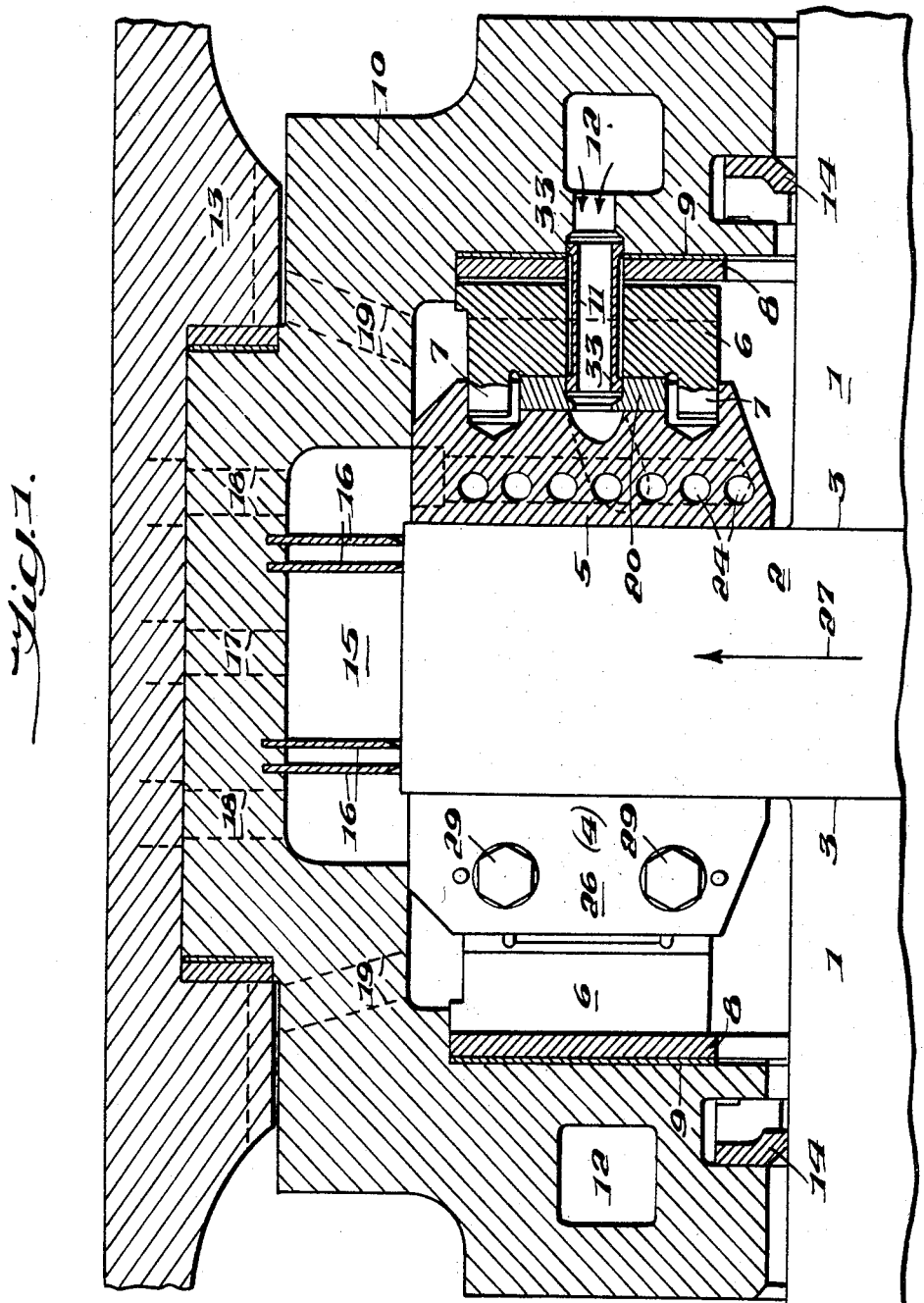
Figure 2:
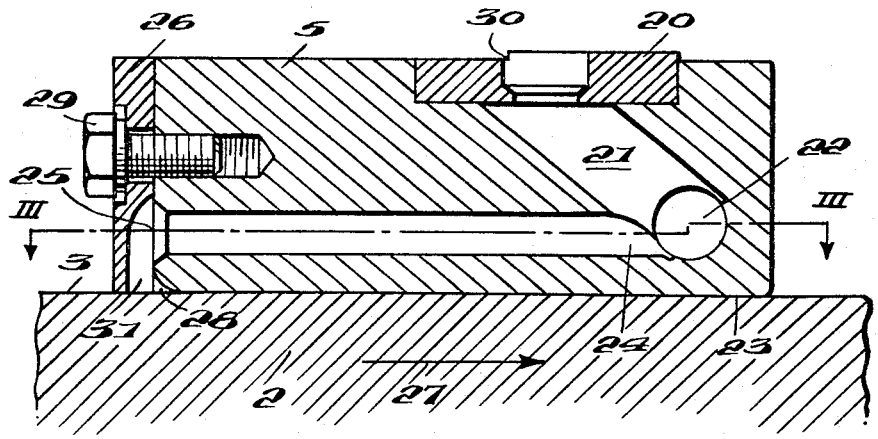
Figure 3:
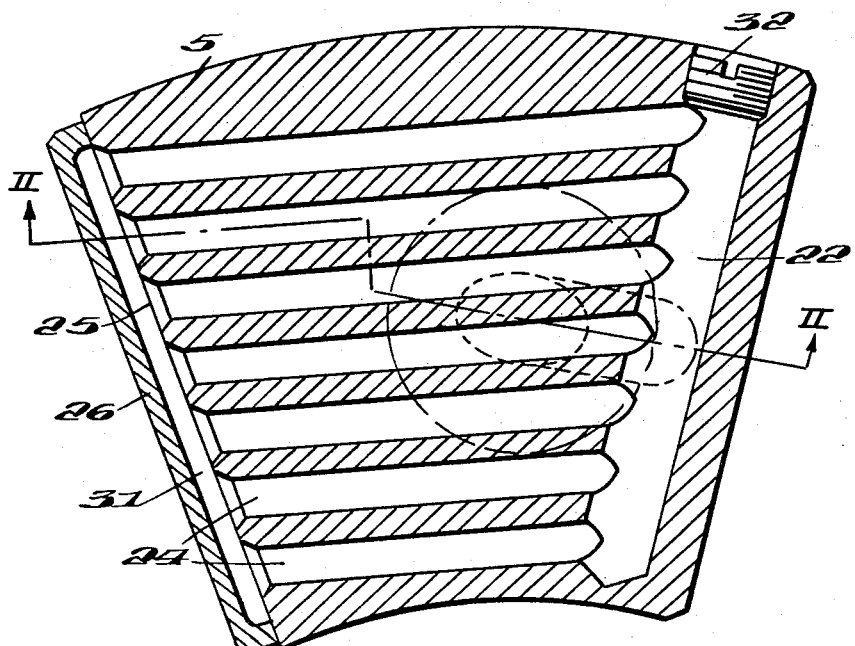

The invention is explained hereinafter by way of example with reference to the accompanying drawings wherein:

FIGURE 1 shows an example of embodiment of an axial plain bearing in vertical longitudinal section through its upper half, FIGURE 2 shows a transverse section through a bearer segment from FIGURE 1, perpendicular to the sliding surface, and FIGURE 3 shows a section through a bearer segment along the section line III—III in FIGURE 2.

In FIGURE 1, the shaft 1 of a turbine is provided with a thrust collar 2 comprising mutually parallel sliding surfaces 3 on both sides. The direction 27 in which the shaft-collar 2 rotates is designated by an arrow. The sliding surfaces 3 are in contact with a plurality of bearer segments 4, 5 distributed over the periphery, the bearer segment 4 being shown in plan view. Like the bearer segment 4, the bearer segment 5 is supported on an elastic spring-bridge 6, to which it is held by the studs 7. A steel washer 20, by way of which the bearer segment 5 rests against the spring-bridge 6, is inserted into segment 5. The spring-bridge 6 rests on a supplementary ring 8. Below the latter there is a thin interposed ring 9 whereof the thickness is so chosen that the prescribed play between the shaft-collar 2 and the bearer segment 5 can be set. The bearer segment 5, spring-bridge 6, supplementary ring 8 and interposed ring 9 are incorporated in a bearing housing 10.

Oil acting as a coolant and lubricant flows to each bearer segment 4, 5 through a pipe 11 arranged between a coolant duct 12 in the bearing housing 10 and the bearer segment 5. The pipe 11 passes through the spring-bridge 6. Because the bearer segment 5 is movable, and the spring-bridge 6 springs inwards under the loading, the ends 33 of the pipe 11 are made spherical, and are mounted so as to seat in matching fashion in the bearing housing 10 and in the middle of the bearer segment 5. The resilience of the spring-bridge 6 allows sufficient longitudinal play in the incorporation of the pipe 11.

The bearing housing 10 is expediently made in two parts, and horizontally separated at axial height. The two parts of the housing are made fast with one another by adapter screws not illustrated in the drawing.

Oil is fed into the duct 12 in the bearing housing 10 through a bearing member 13, the duct 12 being completely filled and being at the designed oil-pressure.

FIGURE 1 furthermore illustrates cooling ducts 24 in the bearer segment 5 for the purpose of passing the oil through. These components are more precisely explained hereinafter with reference to FIGURES 2 and 3, as also are a deflector plate 26 which covers the cooling ducts and is fastened by means of screws 29.

At both ends of the bearing housing 10 on the shaft side, as shown in FIGURE 1, there are thrower rings 14 which prevent any oil from emerging from the bearing housing 10 along the shaft 1.

The annular hollow space 15 between the cylindrical external surface of the shaft-collar 2 and the bearing housing 10 furthermore contains the oil-scrapers 16. They prevent any oil flowing from the sliding surface 3 of the shaft-collar 2 into the hollow space 15, which would lead to undesired friction with associated oil-foaming.

Various apertures 17, 18 and 19 are provided in order to allow the oil emerging from the segments 4, 5 to run away immediately out of the bearing housing 10, and effectively to prevent the annular chamber between the bearing housing 10 and the shaftcollar 2 and the segments 4, 5 from filling with oil. These apertures are situated in the lower part, not shown, of the bearing housing 10, and are indicated in the upper half thereof only for the purpose of explanation.

A bearer segment from FIGURE 1 is more precisely shown in FIGURES 2 and 3, and FIGURE 2 illustrates a transverse section through a bearer segment, the section being illustrated perpendicularly to the sliding surface 3 of the shaft-collar 2 along the line II—II in FIGURE 3, while FIGURE 3 illustrates a section through a bearer segment along the line III—III in FIGURE 2.

The steel washer which is inserted into the bearer segment 5, and by way of which the bearer segment rests against the spring-bridge 6 from FIGURE 1, is designated by 20. From the inlet aperture in the washer 20 for the combined coolant and lubricant, an oblique bore 21 leads to a distributor bore 22 disposed parallel to the sliding surface 23 of the bearer segment 5. A plurality of drilled cooling ducts 24, parallel to the sliding surface 23 of the bearer segment 5 and only a few millimetres from the said surface, branch off from the distributor bore 22. At the other end, the cooling ducts 24 open out into a radial distribution channel 31 which is open along the entire length towards the sliding surface 3 of the shaft-collar 2. The radial duct 31 is formed by milling out a portion of a deflector plate 26 which confronts the discharge ends 25 of the cooling ducts in the face of the bearer segment 5. As is evident from an inspection of FIG. 3, the array of cooling ducts 24 extends throughout substantially the entire area of the bearer face 23 which establishes the sliding contact with the face of the thrust collar 2, and thus serves to establish a highly efficient heat transfer path from the body of the bearer segment to the lubricating medium which at this point serves the function of a liquid coolant prior to delivery to the face of the thrust collar where the liquid then functions as a lubricant. The deflector plate 26 is fastened to the bearer segment 5 by the screws 29. The deflector plate 26, together with the radial duct 31, is disposed on that face of the bearer segment 5 towards which the shaft-collar 2 runs. This is made clear in FIGURE 2 by the direction 27 in which the shaft-collar slides. The effect of the deflector plate 26 is that the oil emerging from the cooling ducts 24 by way of the apertures 25 is deflected and caught up under the bearer segment 5 by the shaft-collar in the direction 27 in which the latter slides. In order to expedite deflection of the oil, and to encourage the formation of a wedge of oil between the sliding surfaces 23 and 3, it is advantageous to round off the leading edge 28 of the bearer segment 5, and to cause the said edge to merge into a slight bevel at the beginning of the sliding surface 23.

In order to ensure that the bearer segment 5 is capable of moving while a wedge of oil is being formed under the sliding surface 23, the washer 20 is expediently provided with a tilting edge 30.

The bores are provided in the bearer segment 5 in simple fashion by first of all drilling the distributor duct 22. Thereupon the cooling ducts 24 of smaller diameter are drilled as far as the duct 22, and then the oblique bore 21 is drilled. The distributor duct 22 is finally closed with the closure screw plug 32.

Axial plain bearings according to the invention may also be used as horizontal bearings acting on one side only, in which case the segments are arranged on one side only of the shaft-collar.

Since all the combined coolant and lubricant flows through the bearer segments, close to the sliding surface thereof, in the axial plain bearing described by way of example, the bearer segments can withstand almost twice the specific surface loading as compared to known bearings. This allows shaft-collars to be made smaller for a given loading, or a greater loading to be imposed for a given size of shaft-collar. In addition, a considerable reduction in the power lost in the axial plain bearing is attained, since the bearing housing is substantially free of oil, and the shaft-collars may be made of smaller dimensions.

What is claimed is:

1. In an axial plain thrust bearing structure for a rotatable shaft having a thrust collar thereon, the combination comprising a plurality of thrust bearer segments distributed around the shaft and which establish a sliding, thrust absorbing contact with a confronting face of said thrust collar, each of said bearer segments including an array of internal cooling ducts arranged substantially parallel with that face of the segment which confronts the face of said shaft collar, said array of internal cooling ducts also extending throughout substantially the entire thrust absorbing contact area of the face of said bearer segment, said array of cooling ducts being connected at the exit ends thereof with a distribution channel which extends substantially radially along said shaft collar and is open along its length in the direction of said shaft collar, and means establishing a flow path for a liquid lubricant under pressure first through said array of cooling ducts for extracting heat from said bearer segments and thence into said open distribution channel for discharge against the surface of said thrust collar for lubricating the contacting faces of said collar and bearer segment.

2. An axial plain thrust bearing as defined in claim 1 wherein said internal cooling ducts in said bearer segments are located close to that face of the segment which contacts the face of the shaft collar.

3. An axial plain thrust bearing as defined in claim 1 wherein said distribution channel is established by a cut-out portion of a deflector plate which confronts the discharge ends of said cooling ducts at an end face of said bearer segment.

4. An axial plain thrust bearing as defined in claim 1 for a horizontally disposed shaft and which further includes a housing therefor providing a chamber surrounding said shaft collar and said bearer segments, and an opening at the lower part of said chamber for immediately draining off the liquid lubricating medium discharged from said distribution channel thereby to keep said chamber from filling with the medium.

References Cited

UNITED STATES PATENTS

| | | | |
|---|---|---|---|
| 1,425,978 | 8/1922 | Kingsbury | 380—160 |
| 1,900,924 | 3/1933 | Firth | 308—160 |
| 2,507,021 | 5/1950 | Lakey | 308—160 |
| 2,778,696 | 1/1957 | Lease | 308—160 |
| 3,194,173 | 7/1965 | Thoma | 308—160 |

MARTIN P. SCHWADRON, *Primary Examiner.*

FRANK SUSKO, *Assistant Examiner.*